(12) United States Patent
Appel et al.

(10) Patent No.: US 10,025,980 B2
(45) Date of Patent: Jul. 17, 2018

(54) ASSISTING PEOPLE WITH UNDERSTANDING CHARTS

(71) Applicant: International Business Machines Corporation, Armonk, NY (US)

(72) Inventors: Ana P. Appel, Sao Paulo (BR); Paulo R. Cavalin, Rio de Janeiro (BR); Vagner F. Santana, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/982,665

(22) Filed: Dec. 29, 2015

(65) Prior Publication Data
US 2017/0185835 A1    Jun. 29, 2017

(51) Int. Cl.
*G06K 9/00* (2006.01)
*G06K 9/18* (2006.01)
(Continued)

(52) U.S. Cl.
CPC ... *G06K 9/00476* (2013.01); *G06F 17/30253* (2013.01); *G06K 9/00483* (2013.01); *G06K 9/18* (2013.01); *G06K 9/6262* (2013.01)

(58) Field of Classification Search
CPC ........ G06Q 10/04; G06Q 10/10; G06Q 20/10; G06Q 30/0202; G06Q 30/0643; G06Q 40/00; G06Q 40/025; G06Q 40/04; G06Q 40/06; G06Q 10/105; G06F 17/246; G06F 17/27; G06F 17/30253; G06F 17/30858; G06F 17/30864; G06F 3/0481; G06F 3/0482; G06F 17/30696; G06K 9/00476; G06K 9/00483; G06K 9/00711;
(Continued)

(56) References Cited

U.S. PATENT DOCUMENTS 6,907,404 B1 *   6/2005   Li ........................ G06Q 20/10
                                                              705/35
6,972,763 B1 *   12/2005   Millett .................. G06F 9/4443
                                                              345/440
(Continued)

FOREIGN PATENT DOCUMENTS

EP    2786335 A1    10/2014
WO    01/29709 A1    4/2001

OTHER PUBLICATIONS

Huang, Weihua et al., "A System for Understanding Imaged Infographics and Its Applications", Proceedings of the 2007 ACM symposium on Document engineering, DocEng '07, Aug. 28-31, 2007, pp. 9-18.*

(Continued)

*Primary Examiner* — Jose Couso
(74) *Attorney, Agent, or Firm* — Cantor Colburn LLP; Louis Percello

(57) ABSTRACT

Aspects of the present invention include a method, system and computer program product. The method includes a method includes selecting a chart, and interpreting contents within the selected chart. The method also includes searching for additional sources of information, and extracting information from the additional sources of information. The method further includes combining the interpreted chart contents with the extracted information, and generating a textual description of the selected chart.

11 Claims, 6 Drawing Sheets

(51) Int. Cl.
*G06K 9/62* (2006.01)
*G06F 17/30* (2006.01)

(58) Field of Classification Search
CPC ........ G06K 9/18; G06K 9/468; G06K 9/4685;
G06K 9/6262; G06K 9/00442; G06K
9/6217; G05B 2219/13144; G05B
2219/23121; G05B 2219/23258; G05B
2219/32004; G05B 2219/32005; G05B
23/0232; G10L 13/02; G10L 25/48; H04L
67/22; H04L 67/306; G09B 29/00–29/14;
G06T 11/206
See application file for complete search history.

(56) References Cited

U.S. PATENT DOCUMENTS

| | | | |
|---|---|---|---|
| 7,254,285 | B1 | 8/2007 | Paek et al. |
| 7,882,002 | B2 | 2/2011 | Monroe et al. |
| 7,962,861 | B2 | 6/2011 | Erwin et al. |
| 8,285,619 | B2 | 10/2012 | Herz et al. |
| 8,370,869 | B2 | 2/2013 | Paek et al. |
| 2009/0187559 | A1 | 7/2009 | Gloor et al. |
| 2011/0271172 | A1 | 11/2011 | Radakovitz et al. |
| 2013/0173215 | A1 | 7/2013 | Patankar et al. |
| 2015/0049951 | A1 | 2/2015 | Chaturvedi et al. |
| 2016/0132215 | A1 | 5/2016 | Zhang et al. |

OTHER PUBLICATIONS

Huang, Weihua et al., "Associating text and graphics for scientific chart understanding", Proceedings of the 2005 Eight International Conference on Document Analysis and Recognition (ICDAR'05), Aug. 31-Sep. 1, 2005, vol. 2, pp. 580-584.*
Huang, Weihua et al., "Chart Image Classification Using Multiple-Instance Learning", IEEE Workshop on Applications of Computer Vision (WACV'07)), Feb. 21-22, 2007, pp. 1-6.*
Choudhury, S.R., et al., Figure Metadata Extraction from Digital Documents Inf. Sci. & Technol., Pennsylvania State Univ., University Park, PA, USA, pp. 135-139, 2013.
Huang, W., et al., Model-based chart image recognition, GREC'03, pp. 87-99, 2003.
Nagarajan, S., et al., Ensemble Classification System for Scientific Chart Recognition from PDF Files, International Journal of Computer Vision and Image Processing, pp. 1-10, 2012.
Zhou, Y., et al., Chart analysis and recognition in document images, ICDAR 2001, pp. 1055-1058, 2001.

* cited by examiner

ASSISTING PEOPLE WITH UNDERSTANDING CHARTS

BACKGROUND

The present invention relates to social networks, and more specifically, to a method, system and computer program product that assists people in understanding the underlying data shown in graphical form on a chart.

For varying reasons, different people have difficulty in understanding or interpreting visual charts—particularly, the data shown in graphical form on the chart. For example, many elementary school children have a difficult time understanding math as it is taught in school. In particular, many children have a problem understanding what is being shown graphically on a chart in a math class.

What is need is a method, system and computer program product that assists people in understanding the underlying data shown in graphical form on a chart.

SUMMARY

According to an embodiment of the present invention, a computer-implemented method includes selecting a chart, and interpreting contents within the selected chart. The computer-implemented method also includes searching, by a processor, for additional sources of information, and extracting, by the processor, information from the additional sources of information. The computer-implemented method further includes combining, by the processor, the interpreted chart contents with the extracted information, and generating, by the processor, a textual description of the selected chart.

According to another embodiment of the present invention, a system includes a processor in communication with one or more types of memory, the processor configured to select a chart, and interpret contents within the selected chart. The processor is also configured to search for additional sources of information, and extract information from the additional sources of information. The processor is further configured to combine the interpreted chart contents with the extracted information, and generate a textual description of the selected chart.

According to yet another embodiment of the present invention, a computer program product includes a non-transitory storage medium readable by a processing circuit and storing instructions for execution by the processing circuit for performing a method that includes selecting a chart, and interpreting contents within the selected chart. The method also includes searching for additional sources of information, and extracting information from the additional sources of information. The method further includes combining the interpreted chart contents with the extracted information, and generating a textual description of the selected chart.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
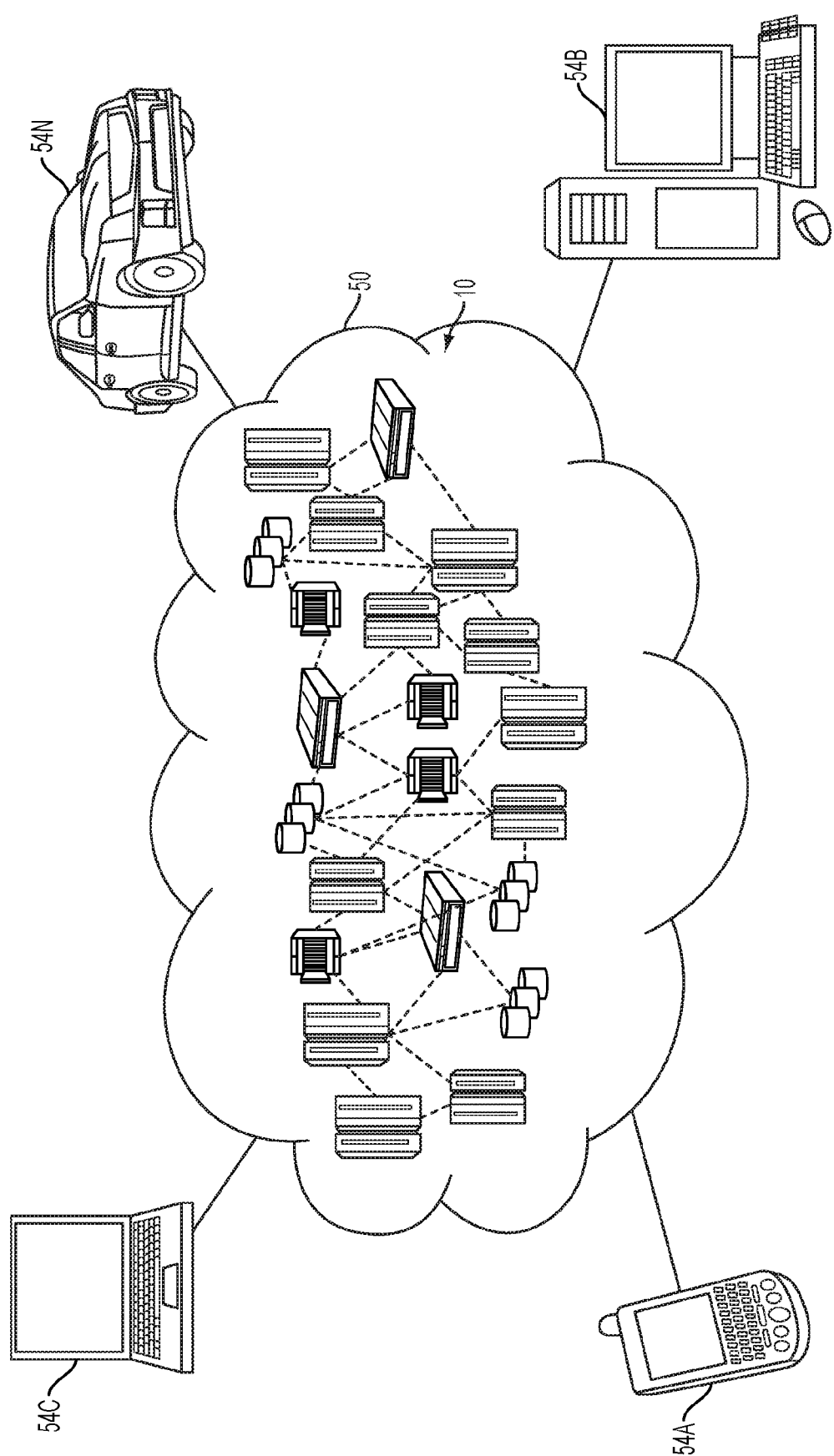
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
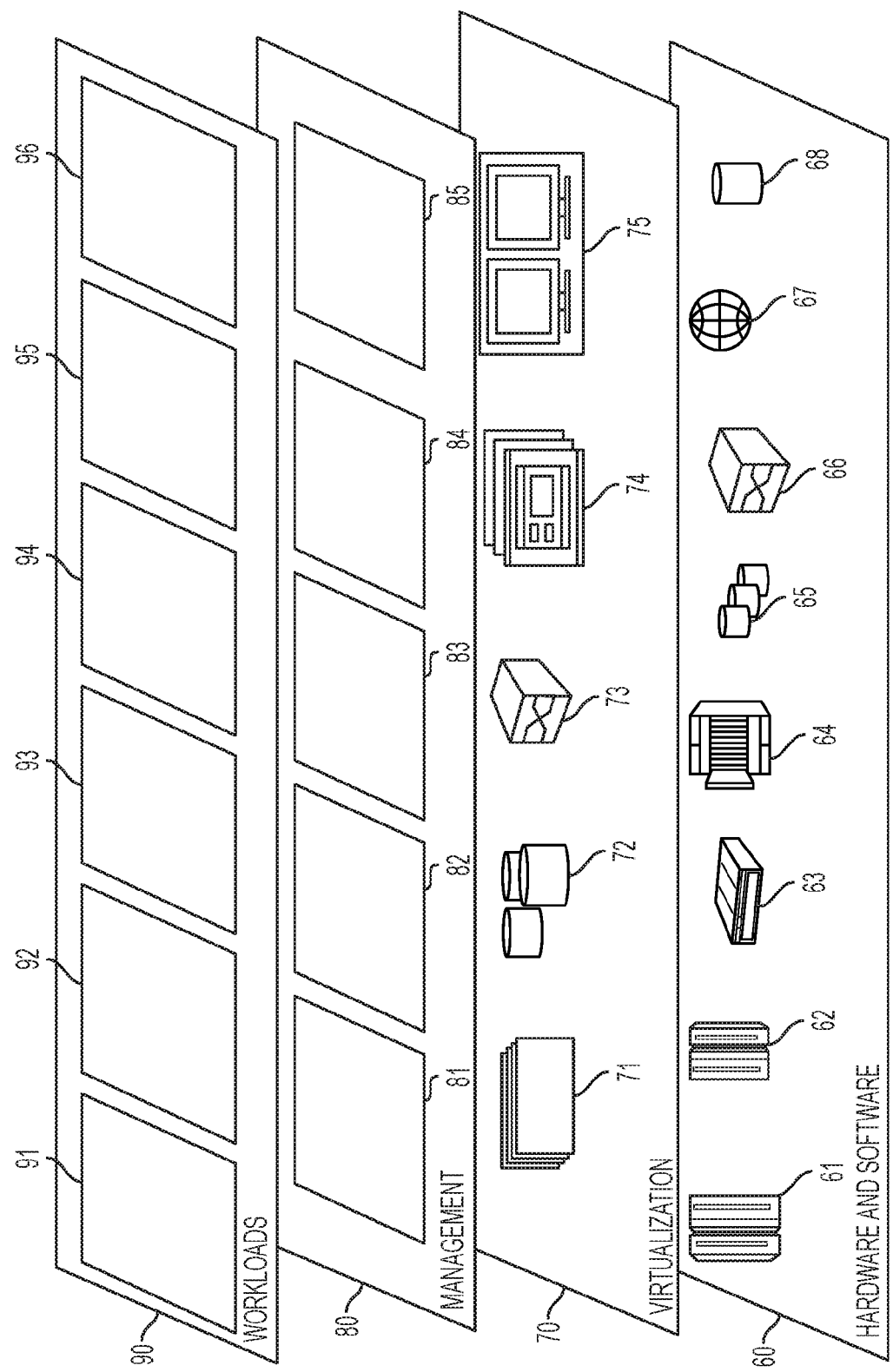
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for interpreting information in a chart and for providing a textual description of the interpreted information in accordance with an embodiment of the present invention.

Figure 3:
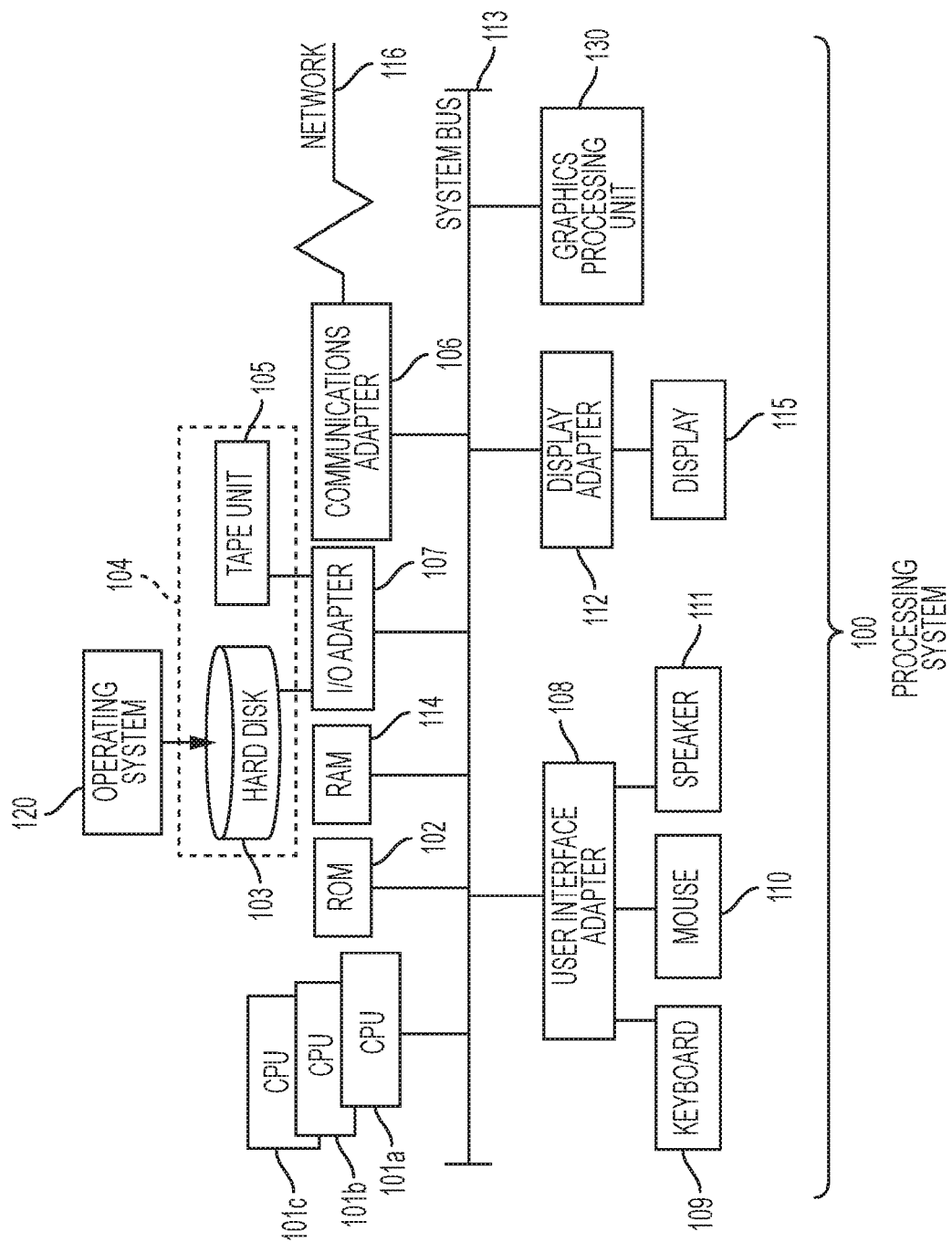
FIG. 3 is a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with exemplary embodiments of the present invention, methods, systems, and computer program products are disclosed for interpreting information in a chart and for providing a textual description of the interpreted information.

Embodiments of the present invention assist people in the understanding of the content of visual charts. The embodiments disclosed may generate and play on demand explanations for a chart being displayed for the user, and may then interact with the users to allow them to explore an explanation of related subjects. In addition, embodiments may combine computer vision and natural language processing for generating textual descriptions of charts.

Exemplary embodiments include learning systems that teach basic math and chart interpretation. Also, decision support systems may count on multiple visualizations that would benefit from a help feature explaining the charts, interacting with users, and detailing terms and components of the chart. Embodiments may be used in cognitive systems to teach people (e.g., those with relatively low education or mathematical understanding problems) to understand the content of visual charts or graphs. Alternatively, embodiments may be used for providing interpreted charts to another system.

The interpretation may be performed by analyzing the contents of the image of the chart, for example, by fitting the different curves, and also by interpreting the labels and legends of the chart to provide additional information. Yet, embodiments may also get insights of a relatively deeper analysis comprising the matching of the information inside the image with complementary sources of information, such as associated documents, web pages, news feeds, social media, etc.

Embodiments of the present invention may comprise interpreting the information within a chart selected by the user and providing explanations for the chart. That is, embodiments allow a user to select a particular chart and then automatically generate and retrieve a textual description of the information inside the chart as output. For example, for a line chart visually presenting the evolution of the profits of two different companies, embodiments may provide textual outputs such as "Company A has increased profit between years X and X+1," and "Company B had a very significant decrease in profit between years Y and Y+1," etc.

The aforementioned interpretation may then be used for different purposes. It may be used, for example, as a tool to assist users in understanding the content of a given chart. It may also be used as input for a decision module, which may be used for automated trading in the stock market, for example. In this case, after the interpretation of the chart is complete, the decision module may then make the most appropriate decision for the subsequent modules of a given system having embodiments of the present invention. This may also be used in cognitive systems to help understand other content that involves charts.

Figure 4:
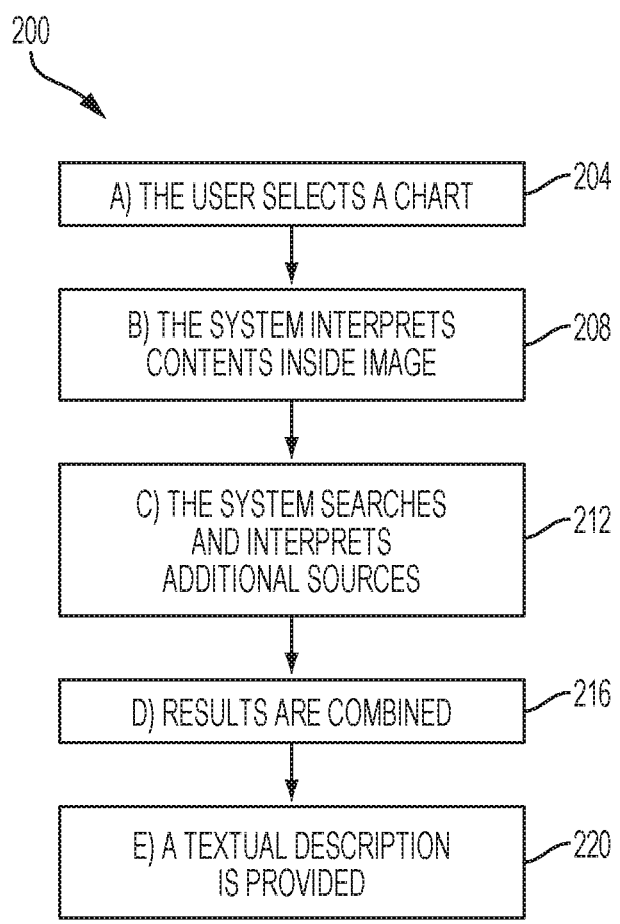
FIG. 4 is a flow diagram of a method for interpreting information in a chart and for providing a textual description of the interpreted information in accordance with an embodiment of the present invention.

With reference now to FIG. 4, there illustrated is flow diagram of a method 200 for interpreting information in a chart (e.g., FIG. 6) and for providing a textual description of the interpreted information in accordance with an embodiment of the present invention. In a step 204, a particular chart is selected, which can be done manually by the user himself/herself, by means of selecting a document file or using an image-capturing device, or in some automated way. The selected chart is then interpreted in a step 208 (more details of step 208 are given in FIG. 5). The results of the interpretation may be combined with information from additional sources of knowledge or information, the search for which is performed in a step 212. In various embodiments, the additional sources of knowledge or information that are searched may comprise, for example, local documents, the internet or web, news feeds, and content from social networks and social media. The search may be conducted based on relevant information found in the chart, such as, for example, company names, specific markets, and other data or information.

The combination of the information extracted from the chart with the information found in the additional sources is performed in a step 216. The combination may be performed such as to weigh the most relevant sources or the results that were found, according to the information inferred from the selected chart. Finally, in a step 220 a textual description is generated to represent the generated interpretation of the selected chart.

Figure 5:
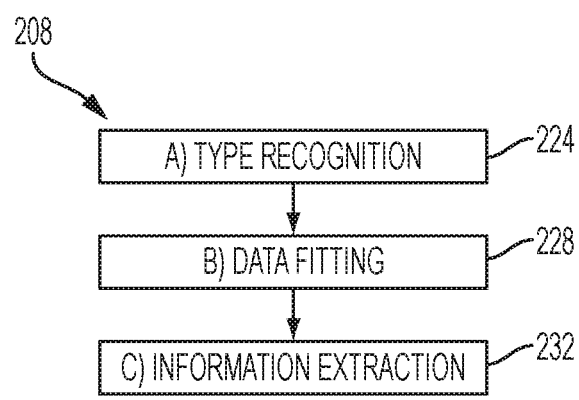
FIG. 5 is a flow diagram illustrating in more detail one of the steps in the method of the flow diagram of FIG. 4 in accordance with an embodiment of the present invention.

Referring now to the flow diagram of FIG. 5, the step 208 of the method 200 of the flow diagram of FIG. 4 is illustrated in more detail. In a step 224, a chart type recognition is carried out. That is, an analysis is performed to determine whether the selected input chart, generally encoded as a digital image, is a line chart, bar chart, pie chart, etc. The set of possible chart types may be defined for a given domain, to reduce the complexity of dealing with multiple types of charts. Visual features such as histogram, texture, and/or shape-based features may be extracted and used as input for a previously trained machine learning classifier which outputs the class of chart with the highest likelihood. Methods based on deep learning (e.g., convolutional neural networks) may also be utilized in this step 224. Chart type specific knowledge may also assist in this step 224 by providing a guide to what type of information can be extracted from the chart image.

Once the type of the chart is known from the step 224, a step 228 is executed in which the most appropriate data fitting is carried out to compute the relatively best data that represents the contents of the image and finds an interpretation for the data. This can be conducted, for example, by using a mean square error method or any related method.

Finally, a step 232 is executed in which information extraction is performed to interpret the contents of legends and axes labels, for instance, to match with the knowledge inferred with the previous data fitting step 228. This information extraction step 232 may utilize use optical character recognition ("OCR"), for example, to match the text inside the image with computer-encoded characters. Also, making use of domain knowledge can assist with finding documents that best match the contents of the chart.

Figure 6:
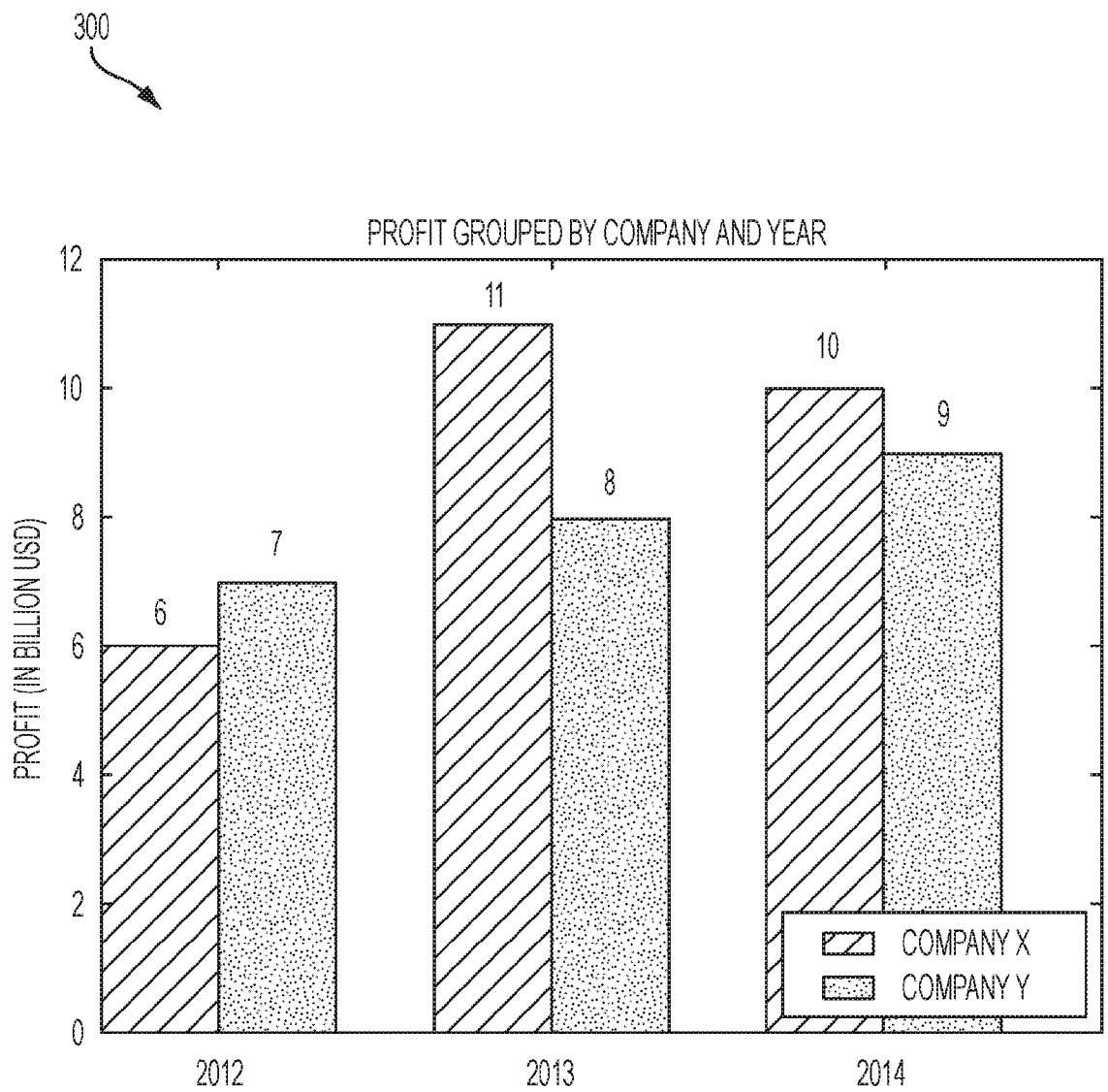
FIG. 6 is a graph having a number of bar charts for use in an exemplary embodiment of the present invention.

Referring now to FIG. 6, there illustrated is a graph or chart 300 having a number of bar charts for use in an exemplary embodiment of the present invention. In the business world, it is common for a user to select a chart in which the user wants to compare information about two companies and understand which company may be the better company to buy its stock. From a set of charts that a system or method implemented in accordance with an embodiment of the present invention is capable of understanding, the system or method detects that this is a bar chart, for example, by making use of an image classification algorithm. The system or method then interprets the information in the chart, such as the meaning of the x and y axis and the legend using, e.g., OCR, and the corresponding values in the bars by comparing the size of the bars in pixels with the values in the y axis, and extracts the amount of profit of companies X and Y over three consecutive years (i.e., from 2012 through 2014).

The system or method may then generate a description and indicate that Company X had a decreasing profit from 2013 to 2014, but a very strong profit growth from 2012 to 2013. The system and method also indicates that Company Y had relatively less strong growth years, but nevertheless grew at steady rates.

Additionally, the system and method searches for more information about these two companies on the web, and finds out that Company X is from the Oil and Gas market, while Company Y is a Bank. By analyzing the states of both the Oil and Gas and Banking markets at each year, the system and method then states that the decrease in profit of Company X is due to a relatively poor time for the Oil and Gas market, but that Company X is still a relatively strong competitor in its market.

Embodiments of the present invention may relate to various business applications, including financial education, for example, for relatively small businesses or merchants. Small merchants with low literacy might face problems when interpreting charts. These charts may explain trends in sales, costs, product storage, etc. Thus, a system and method according to an embodiment of the present invention may assist a small business or merchant to better understand and use charts.

Other embodiments of the present invention may relate to the teaching of chart interpretation for elementary school students. Math is oftentimes a problem subject in school for many children. Specifically, children often have problems understanding charts. However, a cognitive system and method of embodiments that interacts, explains, and help children to understand various types of charts may prove a worthwhile tool to improve learning systems for elementary school students.

Other embodiments of the present invention relate to the accessibility of charts to people having various disabilities. A lack of chart description is a known and common problem found in multiple data sources. However, embodiments may be utilized to support, for example, the visually impaired to consume descriptions and explanations related to a certain graph, thereby allowing users to consume content that is only available in charts.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
selecting a chart;
interpreting contents within the selected chart by at least:
recognizing, by the processor, a type of the selected chart, wherein recognizing a type of the selected chart comprises extracting one or more visual features into a learning classifier that provides a class of chart with the highest likelihood of being the selected chart;
fitting, by the processor, data to determine data that represents the contents within the selected chart; and
extracting, by the processor, information from the selected chart and matching the extracted information with the determined data;
searching, by a processor, a plurality of websites for additional sources of information;
extracting, by the processor, additional information from results of the searching of the plurality of websites for the additional sources of information;
combining, by the processor, the interpreted chart contents with the extracted additional information, wherein combining includes weighting the extracted additional information in terms of relevancy to the interpreted contents of the selected chart; and
generating, by the processor, a textual description of the selected chart based on the weighting of the extracted additional information in terms of relevancy to the interpreted contents of the selected chart.

2. The computer-implemented method of claim 1 wherein fitting data to determine data that represents the contents within the selected chart comprises a mean square error method.

3. The computer-implemented method of claim 1 wherein extracting information from the selected chart comprises an optical character recognition method.

4. The computer-implemented method of claim 1 wherein selecting a chart is performed automatically or by a user.

5. A system comprising:
a processor in communication with one or more types of memory, the processor configured to:
select a chart;
interpret contents within the selected chart by at least:
recognizing, by the processor, a type of the selected chart, wherein recognizing a type of the selected chart comprises extracting one or more visual features of the selected chart and inputting the one or more extracted visual features into a learning classifier that provides a class of chart with the highest likelihood of being the selected unit;
fitting, by the processor, data to determine data that represents the contents within the selected chart; and
extracting, by the processor, information from the selected chart and matching the extracted information with the determined data;
search a plurality of websites for additional sources of information;
extract additional information from results of the searching of the plurality of websites for the additional sources of information;
combine the interpreted chart contents with the extracted additional information, wherein combining includes weighting the extracted additional information in terms of relevancy to the interpreted contents of the selected chart; and
generate a textual description of the selected chart based on the weighting of the extracted additional information in terms of relevancy to the interpreted contents of the selected chart.

6. The system of claim 5 wherein the processor being configured to fit data to determine data that represents the contents within the selected chart further comprises the processor configured to execute a mean square error method.

7. The system of claim 5 wherein the processor being configured to extract information from the selected chart further comprises the processor configured to execute an optical character recognition method.

8. The system of claim 5 wherein the processor being configured to select a chart is performed automatically.

9. A computer program product comprising:
a non-transitory storage medium readable by a processing circuit and storing instructions for execution by the processing circuit for performing a method comprising:
selecting a chart;
interpreting contents within the selected chart by at least:
recognizing a type of the selected chart, wherein recognizing a type of the selected chart comprises extracting one or more visual features of the selected chart and inputting the one or more visual features of the selected chart and inputting the one or more extracted visual features into a learning classifier that provides a class of chart with the highest likelihood of being the selected chart;
fitting data to determine data that represents the contents within the selected chart; and
extracting information from the selected chart and matching the extracted information with the determined data;
searching a plurality of websites for additional sources of information;
extracting additional information from results of the searching of the plurality of websites for the additional sources of information;
combining the interpreted chart contents with the extracted additional information wherein combining includes weighting the extracted additional information in terms of relevancy to the interpreted contents of the selected chart; and
generating a textual description of the selected chart based on the weighting of the extracted additional information in terms of relevancy to the interpreted contents of the selected chart.

10. The computer program product of claim 9 wherein fitting data to determine data that represents the contents within the selected chart comprises a mean square error method.

11. The computer program product of claim 9 wherein extracting information from the selected chart comprises an optical character recognition method.

* * * * *